(12) United States Patent
Efraimsson et al.

(10) Patent No.: US 10,181,362 B2
(45) Date of Patent: Jan. 15, 2019

(54) GROUNDING CONDUCTOR, ELECTRICAL POWER SYSTEM AND USE OF GROUNDING CONDUCTOR

(71) Applicant: NKT Cables Group A/S, Brondby (DK)

(72) Inventors: Lars Efraimsson, Falun (SE); Lars Ingvar Hagman, Soderbarke (SE); Ivars Lars Sune Hansson, Falun (SE); Hans Christian Andersson, Falun (SE); Dietmar Gleich, Falun (SE); Anders Jonas Gatu, Vikarbyn (SE); Tommy K. Valdemar Asmola, Svardsjo (SE)

(73) Assignee: NKT CABLES GROUP A/S, Brondby (DK)

( * ) Notice: Subject to any disclaimer, the term of this patent is extended or adjusted under 35 U.S.C. 154(b) by 0 days.

(21) Appl. No.: 15/522,046

(22) PCT Filed: Oct. 9, 2015

(86) PCT No.: PCT/DK2015/050308
§ 371 (c)(1),
(2) Date: Apr. 26, 2017

(87) PCT Pub. No.: WO2016/070880
PCT Pub. Date: May 12, 2016

(65) Prior Publication Data
US 2017/0316846 A1    Nov. 2, 2017

(30) Foreign Application Priority Data
Nov. 7, 2014   (EP) .................................... 14192339

(51) Int. Cl.
*H01B 1/02*    (2006.01)
*H01R 4/66*    (2006.01)
(Continued)

(52) U.S. Cl.
CPC .............. *H01B 1/023* (2013.01); *C08L 23/12* (2013.01); *C08L 23/16* (2013.01); *H01B 1/125* (2013.01);
(Continued)

(58) Field of Classification Search
CPC ........ H01B 1/023; H01B 1/125; H01B 9/008; H01B 1/02; H01B 1/00; H01B 9/00;
(Continued)

(56) References Cited

U.S. PATENT DOCUMENTS 3,297,814 A    1/1967   McClean
3,571,613 A    3/1971   Plate
(Continued)

FOREIGN PATENT DOCUMENTS

CN    202677864 U    1/2013
EP    0 136 039 A2    4/1985
(Continued)

OTHER PUBLICATIONS

International Search Report for PCT/DK2015/050308 dated Dec. 1, 2015.
(Continued)

*Primary Examiner* — Angel R Estrada
(74) *Attorney, Agent, or Firm* — Pearne & Gordon LLP (57) ABSTRACT

The application relates to a grounding conductor and an electrical system including such a grounding conductor including a plurality of conductive aluminum strands where each such strand is provided with at least one sheath of an electrically conductive polymer material having a volume resistivity (ρ) below 100 Ω·cm.

15 Claims, 6 Drawing Sheets

(51) Int. Cl.
*H02G 13/00* (2006.01)
*C08L 23/12* (2006.01)
*C08L 23/16* (2006.01)
*H01B 1/12* (2006.01)
*H01B 9/00* (2006.01)

(52) U.S. Cl.
CPC ............... *H01B 9/008* (2013.01); *H01R 4/66* (2013.01); *H02G 13/40* (2013.01); *C08L 2203/202* (2013.01); *C08L 2205/02* (2013.01)

(58) Field of Classification Search
CPC ........ H02G 13/40; H02G 13/00; C08L 23/12; C08L 23/16; C08L 2203/202; C08L 2205/02; C08L 23/00; H01R 4/66
USPC ......... 174/40 R, 68.1, 78, 70 R, 90, 102 SC, 174/102 A
See application file for complete search history.

(56) References Cited

U.S. PATENT DOCUMENTS

| | | | |
|---|---|---|---|
| 3,632,720 A | 1/1972 | Mildner | |
| 3,660,592 A | 5/1972 | Anderson | |
| 3,794,752 A | 2/1974 | Bunish | |
| 3,816,644 A * | 6/1974 | Giffel | H01B 7/04 174/120 SC |
| 4,025,715 A | 5/1977 | Foley | |
| 4,626,619 A | 12/1986 | Uematsu | |
| 7,745,728 B2 | 6/2010 | Fisher et al. | |
| 7,754,969 B2 * | 7/2010 | Kummer | H01B 7/184 174/116 |
| 2006/0105616 A1 | 5/2006 | Fisher | |
| 2009/0071685 A1 | 3/2009 | Fisher et al. | |
| 2010/0078194 A1 | 4/2010 | Bhatt | |
| 2015/0096783 A1 * | 4/2015 | Wassmuth | H01B 11/08 174/105 SC |
| 2016/0072238 A1 * | 3/2016 | Rengert | H01B 3/445 174/102 SC |

FOREIGN PATENT DOCUMENTS

| | | |
|---|---|---|
| GB | 2 061 597 B | 5/1981 |
| JP | 59-211975 A | 11/1984 |
| JP | 10-223279 A | 8/1998 |
| WO | 2011/159446 A1 | 12/2011 |

OTHER PUBLICATIONS

Communication Pursuant to Article 94(3) EPC for EP 15 839 134.2 dated Jun. 6, 2017.
Written Opinion for PCT/DK2015/050308 dated Dec. 1, 2015.

* cited by examiner

GROUNDING CONDUCTOR, ELECTRICAL POWER SYSTEM AND USE OF GROUNDING CONDUCTOR

TECHNICAL FIELD

The invention relates to a grounding conductor e.g. in the form of a grounding line, a rod, or a mesh, as well as it relates to an electrical power system comprising such grounding conductor and use of a grounding conductor.

BACKGROUND ART

Grounding conductors (also termed earthing conductors according to US nomenclature) are well known in the art, where this term herein means a grounding conductor intended for air and/or ground laid power line distribution network applications, where the grounding conductor is adapted to be laid underground, in water or in air, outside or inside ducts; and where the grounding conductor is provided in connection with or at a distance to an AC or DC power cable, such as an AC single or three phased power cable, or power structure, such as a pole, a transformer station, or a building, which power cable or structure is provided above ground, or provided in direct contact with or alongside said power cable in the ground. The purpose of the grounding conductor is to form a ground or earth potential to the power cable or structure. Some grounding conductors are provided following, along, or being integrated with ground laid power cables. In some cases at least part of said grounding conductor is provided following, along, or integrated with aerial power cables. The grounding conductor can be applied in the ground near individual poles, on site providing system ground, under transformers, or close by buildings, e.g. by providing a mesh, or can be applied following the power cable and laid underground as a ground conductor. Said conductor can be utilized comprising any suitable diameter as to form straight or twisted wires, strands, rods, or pipes.

Further, the term "grounding conductor" is herein defined as a conductor suitable for being in electrical contact with the surrounding environment for providing grounding potential along substantially the entire length of the grounding conductor where laid in the ground. Thus, the term "grounding conductor" does not cover externally electrically insulated and internally electrically conducting conductors which only provide grounding potential at the conductor end or ends with e.g. a cable lug or clamp.

A bare copper material is conventionally used as a grounding device. Bare copper materials serving as grounding devices may be arranged on or in the earth buried at a predetermined depth, and the copper materials being arranged in a grid pattern in a vertical and horizontal directions. This constitutes a mesh electrode. By way of example, a grounding device having such a mesh electrode is disclosed in the Unexamined Japanese Patent Application Publication (Tokkai-Sho) No. 59-211975.

However, when the conventional grounding device exhibiting a bare metal surface such as bare copper e.g. constituting a mesh electrode as described above, said bare metal devices are arranged directly in contact with and inside the soil of the earth. Accordingly, corrosion of the bare metal grounding device is facilitated by moisture in the soil, the acidity of the soil, the concentration of salt in the soil, and the like. Thus, disadvantageously, the buried grounding device can be damaged thereby and may be subjected to a disconnection or the like, thus spoiling the grounding function of the grounding device.

Generally, bare copper grounding devices tend to exhibit a long lifetime due to its good inherent corrosion stability. However, other metals are more easily corroded, such as e.g. aluminium and iron.

If the bare metal is covered with a low resistance material comprising a compound of electrically conducting carbon material and a binder material, often called a cement, thus providing a grounding conductor, a disconnection or the like caused by the corrosion attributed directly to the soil is of course less likely to occur as compared to when the bare metal, such as the aluminium or iron arranged directly in the earth.

However, the specific resistance of the soil may change rapidly locally due to environmental or soil conditions, such as lightning strikes or water content, or it may change over the length of the grounding conductor. Thus, in areas in which the grounding conductors are not completely covered with low resistance material, e.g. has holes due to e.g. mechanical damages or lightning induced damages, which holes lead to one or more areas of exposed bare metal. In these areas electromagnetic leaders may form and extend from the ground conductors during such lightning strikes, as the carbon in the covering compound is very unlikely to be ionized. Consequently, in an electrolytic state such as the one in the soil, contact with the bare metal surface areas causes such conventional grounding conductors to be corroded by a battery action resulting from a difference in potential between ground and metal strand in these areas, leading to a direct current flowing here, causing what is called galvanic corrosion. When exposed to particularly disadvantageous environmental or soil conditions, such damaged grounding conductors can then experience even very fast galvanic corrosion, even and especially when only tiny holes are provided, which may lead to malfunction, disconnection, or the like.

The rising cost of copper materials and poor social conditions in some parts of the world have made it a lucrative business for some people to steal copper containing objects, such as grounding conductors. This leads to the loss of ground connection of the power cables, which may lead to equipment failure(s) and—more seriously—a risk for living beings being exposed for lethal electric shock. The purpose of the grounding conductor, in combination with other protective devices such as fuses and residual current devices, is ultimately to protect and ensure that living beings do not come into contact with metallic or leading objects, such as a power line or the ground itself, whose potential relative to the living beings own potential exceeds a "safe" threshold, typically set to around 50 V.

Further, the rising copper costs and the stolen copper also encourage suppliers and operators of power lines to consider reducing the amount of copper materials being utilized, in particular when installing or re-installing longer lengths of grounding conductor along a power cable.

It has been attempted to substitute all or at least part of the copper material of the grounding device or conductor with less costly materials, such as iron, aluminium, copper clad aluminium, magnesium, or even tin. Even though aluminium inherently—on contact with oxygen—forms a thin layer of aluminium oxide which generally tend to lower surface corrosion, aluminium does tend to be more reactive with water than copper. Further, aluminium is less electrically conductive, around 40-60% less conductive. Thus, aluminium conductors generally are made with a corresponding larger diameter in order to attain the same resistance as the copper ones.

EP 0 136 039 dating from 1983 describes a grounding device in the form of a ground rod or mesh mat intended for lightning protection by burial in the ground, where the device comprises a metallic central member, e.g. made of aluminium or preferably steel, and a surrounding electrically conductive polymer member for moisture protection. The polymer member has a specific resistance of from 0.01 Ωcm to 10 Ωcm.

JP 10-223279 dating from 1996 describes a method of preventing the oxidation of a grounded electrode made from copper, aluminium or steel by using a semi-conductive anticorrosive layer formed on a conductor as the grounded electrode to be electrically connected to electric equipment and embedded in the ground. The semi-conductive anticorrosive layer is formed by covering a crosslinked or non-crosslinked semiconductive polyethylene composite with a semi-conductive resin composite containing conductive carbon black by extrusion, and its volume specific resistance is set to $1/20$-$1/100$ of the specific resistance of the soil embedding the electrode.

Contrary to what one would expect, an increased use of aluminium grounding devices has yet to be seen, since no commercially accepted solution has been provided, in particular the problem of corrosion protecting aluminium surfaces has not been dealt with sufficiently.

Inventor has previously in several tests and attempts tried to find a solution by applying one or more twisted aluminium strands with conductive resin, such as the polyethylene-based semi-conductive jacketing polymers sold under the trade number LE0563 from the company Borealis and trade number DHDA 7708-BK from company DOW. But Inventor has hitherto failed to produce any suitable solution where the polymer was sufficiently protective against water and leak current corrosion, at least when damaged, while at the same time providing a suitably conductive or grounding capable grounding conductor.

SUMMARY OF THE INVENTION

It is an object of the present invention to provide an economical alternative to copper grounding devices.

A further object of the present invention is to provide a grounding conductor, which utilizes aluminium as a grounding conductor material alternative, and which also addresses at last some of the above mentioned disadvantages with prior art grounding conductors.

To fulfil the above object, as well as to solve other problems, which will become apparent in the following description, the present invention provides a grounding conductor as disclosed in the appended claims.

According to an aspect of embodiments, the object is achieved by a grounding conductor comprising at least one conductive aluminium strand provided with a sheath comprising an electrically conductive polymer material having a volume resistivity ($\rho$) below 100 Ω·cm. The grounding conductor comprise a plurality of conductive aluminium strands wherein each such strand is provided with at least one sheath comprising an electrically conductive polymer material having a volume resistivity ($\rho$) below 100 Ω·cm.

Since the grounding conductor comprises a plurality of conductive aluminium strands wherein each such strand is provided with at least one sheath comprising an electrically conductive polymer material having a volume resistivity ($\rho$) below 100 Ω·cm, a grounding wire comprising aluminium is provided, which fulfils the requirements of a grounding conductor. Moreover, due to the provision of the plurality of sheathed conductive aluminium strands the properties of the grounding conductor are maintained even if some of the sheaths comprising electrically conductive polymer are damaged. As a result, the above mentioned object is achieved.

According to some embodiments there is provided a grounding conductor comprising at least one conductive aluminium strand having a strand diameter, dw, along the length thereof, where each such strand is provided with at least one sheath of an electrically conductive polymer material having a sheath thickness, ts, and having a volume resistivity, p, below 100 Ω·cm. In one embodiment the material of said electrically conductive polymer is such that for at least said one aluminium strand at least one of these criteria is true: Criteria 1) that when comparing a sheathed-strand potential difference and a bare-strand-potential difference, said sheathed-strand potential difference is lower than said bare-strand potential difference at least at one point over a first test current range when testing according to the following first test procedure: —providing a length, ls, of said at least one sheathed aluminium strand; —a1) submerging a portion of said length into a 1 vol % sodium sulphate solution wherein a metal electrode is provided at a distance to said aluminium strand; —b1) applying a test current within said first test current range over said at least one sheathed aluminium strand such that a negative test potential is applied to said aluminium strand relative to said electrode; —c1) acquiring said sheathed-strand potential difference between said at least one sheathed aluminium strand and said electrode; —d1) repeating steps a1) to c1) over said first current test range at suitable intervals; —e1) stripping the sheath entirely from the same length, ls, of aluminium strand and testing according to the steps a1)-d1) except in c1) acquiring said bare-strand potential difference. Criteria 2) that when comparing a sheathed-strand potential difference and a sheathed-strand-with-hole potential difference, said sheathed-strand-with-hole potential difference is higher than said sheathed-strand-potential difference at least at one point over a second test current range, when testing according to the following second test procedure: —providing a length, ls, of said at least one sheathed aluminium strand; —a2) applying a test current within said second test current range over said at least one sheathed aluminium strand and said electrode such that a potential difference is provided between said at least one sheathed aluminium strand and said electrode; —b2) acquiring said sheathed-strand-potential difference; —c2) repeating said steps a2) to b2) over said second current test range at suitable intervals; —d2) making a hole in the sheath from the same length, ls, of aluminium strand and testing according to the steps a2)-c2), except in b2) acquiring said sheathed-strand-with-hole potential difference.

Meeting at least one of the test criteria 1) or 2) means that the grounding conductor comprising said conductive polymer material is suitable for the application, in that the galvanic corrosion tendency is lowered, as well as the grounding capability is increased, as well as lightning impulse removal effectiveness is improved. When said sheathed-strand-potential is lower than the bare-strand-potential the contacting surfaces might even provide a potential "well" which the electrons are being led into. This has been tested for low currents as up to 5 mA on aluminium strand in the 1 vol % sodium sulphate solution.

With a grounding conductor as defined by the claims, there are provided two ways to investigate whether a conductive polymer sheath material is suitable as a conductive polymer material for aluminium containing grounding conductors, at least what concerns the sheaths corrosive inhibitor properties. It has also been seen that the material then is much better electrically conducting and thus provides a better grounding effect. Such material seems to enable a very low voltage potential drop over it compared to other conductive polymers. Such sheath seems to provide a lower voltage potential bridge which the electrons of the electrical current "needs to" overcome, in fact it seems as if the sheath is even better at conducting the current to ground than the bare aluminium material is.

Advantageously, the material of said electrically conductive polymer is such that said at least one of said one or more aluminium strands can pass both of said two test procedures.

An unsuitable polymer will instead generate a high voltage drop between the aluminium stand and the surrounding medium (e.g. soil) of the conductor. An unsuitable polymer thus, will render the conductor unsuitable for use as a grounding conductor. Further, an unsuitable polymer may cause corrosion of the aluminium strand.

Advantageously, the size of such test hole in the sheath for the above discussed test criteria in its longitudinal extension relative to the length ls of the sample may be in the range of less than 10%, such as less than 5%, such as less than 4%, such as less than 2%, such as less than 1% thereof. The test hole may be in the form of a slit thus, having no substantial extension in a circumferential direction of the relevant strand.

In practical use, a hole may be created in the sheath due to an unintentional damage, e.g. during manufacturing of the grounding conductor, handling of the grounding conductor, or laying of the grounding conductor. Due to the properties of the conductive polymer discussed herein, the grounding properties of the grounding conductor are not particularly affected by such a hole.

Inventor presume the advantageous grounding effect may have to do with the polymer material providing a good conductive contact with the outer surface of said at least one aluminium strand and onwards towards the generally much more resistive earth potential, when in use. This seems to provide a very low potential wall for the electrons of the electrical current to "overcome", see below for list of parameters which may influence the test results and provide a suitable grounding conductor.

In an embodiment, at least some of the plurality of aluminium strands may be twisted around each other.

In an embodiment, at least some of the plurality of conductive aluminium strands may entirely surround one centrally provided conductive aluminium strand of the plurality of conductive aluminium strands. In this manner the centrally provided conductive aluminium strand may be mechanically protected by the surrounding aluminium strands.

In an embodiment, a total transitional resistance for one of the plurality of the conductive aluminium strands provided with at least one sheath to a surrounding media may be lower than a transitional resistance for a bare conductive aluminium strand of the plurality of the conductive aluminium strands to the same surrounding media.

In an embodiment, the conductive polymer material may comprise a polyolefin mixed with an elastomer, 10-40% high purity carbonaceous material, and an antioxidant. In this manner a sheath having a volume resistivity $\rho$ below 100 $\Omega \cdot cm$ may be provided in a durable material suited for good conductive contact to the aluminium strand.

In an embodiment, the conductive polymer material may comprise polypropylene mixed with an ethylene/propylene elastomer, 23-30% carbon black, and a phenolic antioxidant polyolefin mixed with an elastomer. In this manner a sheath having a volume resistivity $\rho$ below 40 $\Omega \cdot cm$ may be provided. Typically the sheath may have a volume resistivity $\rho$ within a range of 5-40 $\Omega \cdot cm$. Such a conductive material provides a good conductive contact to the aluminium strand. Furthermore, the conductive polymer material provides a wear resistance, a hardness, and a toughness which is higher compared to many other conductive polymer materials. Thus, the grounding conductor is suited to withstand the handling it is subjected to during laying and use as a grounding conductor. Accordingly, the grounding conductor provides a realistic alternative to the hitherto used copper grounding conductors.

In an embodiment, the conductive polymer material may comprise comprises 62-68% polypropylene mixed with an ethylene/propylene elastomer, 23-30% carbon black, and 2-4% phenolic antioxidant. In this manner a sheath having a volume resistivity $\rho$ below 40 $\Omega \cdot cm$ may be provided. Typically the sheath may have a volume resistivity $\rho$ within a range of 5-40 $\Omega \cdot cm$. Such a conductive material provides a good conductive contact to the aluminium strand. Particularly, the conductive material may penetrate into pores of the aluminium strand. Furthermore, the conductive polymer material provides a wear resistance, a hardness, and a toughness which is higher compared to many other conductive polymer materials. Thus, the grounding conductor is suited to withstand the handling it is subjected to during laying and use as a grounding conductor. Accordingly, the grounding conductor provides a realistic alternative to the hitherto used copper grounding conductors.

In an embodiment, the conductive polymer material may comprise 25-70% polypropylene, 15-55% ethylene/propylene elastomer, 23-30% carbon black, and 2-4% phenolic antioxidant. In this manner a sheath having a volume resistivity $\rho$ below 40 $\Omega \cdot cm$ may be provided. Typically the sheath may have a volume resistivity $\rho$ within a range of 5-40 $\Omega \cdot cm$. Such a conductive material provides a good conductive contact to the aluminium strand. Particularly, the conductive material may penetrate into pores of the aluminium strand. Furthermore, the conductive polymer material provides a wear resistance, a hardness, and a toughness which is higher compared to many other conductive polymer materials. Thus, the grounding conductor is suited to withstand the handling it is subjected to during laying and use as a grounding conductor. Accordingly, the grounding conductor provides a realistic alternative to the hitherto used copper grounding conductors.

The %-figures discussed above relate to weight % (wt %).

In an embodiment, the phenolic antioxidant may be of Irganox-type.

Suitably, the carbon black used in the conductive polymer material may be a high purity carbon black. Such a high purity carbon black has a low content of impurities and may have a homogenous particle size.

In an embodiment, each of the plurality of conductive aluminium stands provided with a sheath may have an aluminium strand diameter (dw) within a range of 0.2-25 mm, such as within a range of 0.5-8 mm, and a sheath thickness (ts) within a range of 0.2-0.7 mm, such as from 0.25 mm to 0.5 mm, such as from 0.35 mm to 0.45 mm.

According to a further aspect of embodiments there is provided an electrical power system comprising a power cable or structure, which is grounded through a grounding conductor according to any aspect and/or embodiment(s) discussed herein buried in the ground and in grounding contact with the ground along the length thereof.

In an embodiment, the electrical power system may comprise a power cable, wherein the grounding conductor at least along one length of the power cable is provided alongside and in contact with an outer surface of the power cable.

In an embodiment, the power cable may be an aerial cable, and the grounding conductor may be provided in the ground and along at least a part of the power cable.

According to a further aspect of embodiments, there is foreseen a use of a grounding conductor according to any aspect and/or embodiment(s) discussed herein as a ground conductor running in parallel with a power cable between two power structures to provide a ground potential to the power cable or the power structure.

In an embodiment, the two power structures may be transformer stations.

In an embodiment, the ground conductor may be laid underground.

In one embodiment said first test current range is equal to or below 20 mA, such as equal to or below 10 mA, such as equal to or below 5 mA, such as equal to or below 2 mA, such as equal to or below 1.5 mA, such as equal to or below 1 mA, and said second test current range being in the range of equal to or less than 100 mA, said ranges selected depending upon the aluminium material amount in said length ls of aluminium strand, optionally said first test current range may be equal to said second test current range.

Generally, the current test range is adapted to suit the aluminium amount within the sample, as mentioned, i.e. on diameter and length ls. As shown in the diagrams and tables from the tests performed, see below, the first test current range is more "sensitive" in that generally the criteria 1) can be fulfilled only at rather low current levels around less than 10 mA. Further, the criteria 2) seem to be more generally true over a broader current range, e.g. over the entire range below 100 mA.

Other current ranges may be contemplated by the skilled person depending on strand and conductor diameters and lengths being tested. In fact, during all of the second test procedures performed, said sheathed-strand-with-hole-potential difference was always equal to or higher than said sheathed-potential-difference for any test current value for a suitable conductive polymer material.

Hereby the costs of laying grounding conductors can be significantly decreased, because the grounding conductor comprising aluminium according to the invention can now substitute the conventional use of copper therein. The present grounding conductor is sufficiently protected against corrosion damage and is provided with sufficient mechanical strength, thus it performs adequately when subjected to abrasion tests. The corrosion and abrasion susceptibility of the conductor can be determined using the IEC standard 60229, "Tests on extruded oversheaths of electrical cables with a special protective function", and the grounding conductor according to the invention advantageously can pass these tests.

Thus, there is provided a grounding conductor comprising one or more aluminium strands, where the material of the sheath is selected such as to fulfil at least one of these two test procedure criteria for the ground conductor.

In an embodiment of said grounding conductor said electrically conductive polymer material has a volume resistivity $\rho$ below 100 $\Omega \cdot$cm, such as below 50 $\Omega \cdot$cm, such as below 30 $\Omega \cdot$cm, such as below 5 $\Omega \cdot$cm. By providing the polymer with conductive particulates, such as carbon black, and selecting these small enough to enter into a sufficient contact with the aluminium surface as well as sufficiently many, a suitable volume resistivity can be achieved, preferably below 30 $\Omega \cdot$cm, which improves the grounding property of the grounding conductor.

In an embodiment of said grounding conductor, said sheath thickness ts is in the order of from 0.2 mm to 1.5 mm, such as from 0.2 mm to 0.7 mm, such as from 0.25 mm to 0.5 mm, such as from 0.35 mm to 0.45 mm. Tests have shown that such sheath layer thicknesses are suitable for providing both sufficient mechanical stability and sufficient corrosion protection. Surprisingly, these sheath thicknesses often seemed to lie well below the necessary thicknesses of conventional aluminium corrosion protection sheaths, e.g. also as used inside power cables, which generally lie in the order of around 1 mm to 3 mm.

Surprisingly, extensive tests performed by Inventor have shown that even when providing a relatively thin protective layer of said electrically conductive material on aluminium strands, where relatively thin layer here means in the order of below 2 mm, the resulting corrosion tendency is still reduced. Indeed, even when holes are provided in the material the aluminium strand seems to be at least to a certain degree protected against corrosion as well by such conductive polymer material. This is contrary to intuitive thinking, and also contrary to prior art tests and results from corresponding aluminium strand grounding conductors, which indicated that the thicker the layer of protective electrically conductive material was, the better the corrosion protection would also become.

Inventors tests have also shown that for the grounding conductor to be mechanically stable a certain sheath thickness is advantageous for providing improved mechanical stability. Thus, the sheath thickness should advantageously be adapted to suit both the requirements of reaching as low a resistance towards earth as possible, i.e. towards a thinner sheath, attaining the necessary corrosion protection, as well as improved mechanical stability, i.e. towards a thicker sheath, see below on corrosion and abrasion tests performed by Inventor.

In an embodiment of said grounding conductor at least one sheath covers substantially the entire surface of the longitudinal length of said at least one aluminium strand. This eases production and thus reduces manufacturing costs since continuous lengths of extruded polymer material may be provided.

It further fulfils customer expectations of a corrosion protected aluminium grounding conductor being entirely protected by conductive polymer sheath, since it hitherto, until Inventor developed this inventive grounding conductor, was a notion within the field that in order to improve the corrosion protection of aluminium one needs to add a water or humidity protection layer, such as a fully covering polymer sheath.

In an embodiment of said grounding conductor the sheath is provided with at least one test hole exposing a hole surface area of said at least one aluminium strand, which at least one hole has a longitudinally extending size in the order of equal to or lower than 5% of the length (ls) of said aluminium strand. Surprisingly, as mentioned above, the corrosion protective effect of the conductive polymer sheath of the present invention is sufficient also when the conducting polymer is provided with such holes, e.g. before and/or during extrusion of the sheath upon the strand, or provided after extrusion, either in a further manufacturing step, or during operation, laying in the ground. Depending on polymer material utilized, and the intrinsic properties thereof, this longitudinal hole size may vary, but a total longitudinal hole size of 5% could at least pass the corrosion test according to the IEC standard 60229.

In an embodiment of said grounding conductor said aluminium strand diameter dw is in the order from around 0.5 mm to around 25 mm, typically within a range of 0.5-8 mm. Thus, suitable aluminium strand diameters, as well as grounding conductor diameters can be obtained for manufacturing grounding rods, meshes, and lines as well, which provide sufficient mechanical stability as rods, lines, or mesh, and provide a sufficient grounding effect, The larger the diameter dw is the more current can be supplied. Advantageously, for grounding conductors in the form of rods, a larger diameter dw may be suitable as these often are hammered into the ground. However, the smaller the strand diameter dw is, the larger the aluminium surface area to material weight ratio is, which improves the grounding capability of the grounding conductor. The lower limit of suitable strand diameter dw may be limited to a minimum diameter for undergoing the extrusion process drawing force when applying the polymer sheath onto the strand.

In an embodiment of said grounding conductor, said grounding conductor comprises a plurality of said aluminium strands, each one of these strands being individually sheathed.

Thus, a smaller strand diameter dw can be applied for improving the grounding capability when combining several sheathed strands together in a bundle, which bundle is then also more mechanically stable, e.g. when used as a lightning rod. Further, the corrosion protecting effect for each individually protected strand enables an improved corrosion protection effect: Even if one strand is compromised with a damage in the polymer sheath, the other strands of the bundle are 1) still corrosion and damage protected 2) still providing a sufficient grounding effect.

Optionally, at least some of said plurality of aluminium strands is twisted around each other. A part of or the whole bundle is twisted around for preventing splicing into individual strands, as well as still providing a certain amount of longitudinal flexibility.

Optionally, at least some of said plurality of aluminium strands, such as four, five, six, seven, eleven, or nineteen, are surrounding, such as entirely surrounding, at least one centrally provided object. This object may be selected from the group comprising 1) an electrically conducting metal strand, 2) said individually sheathed aluminium strand, 3) an optical fibre. Optionally, said plurality of aluminium strands are provided in at least one strand layer around said at least one object.

These may be said individually sheathed aluminium strands forming themselves grounding conductors according to the invention. These strands may be other types of bare or sheathed metal strands, and the metal can be aluminium, steel, copper, or other metal. Thus, these individually sheathed strands can mechanically and corrosive-wise protect this or these centrally provided strand or strands, and still provide for an excellent grounding capability. When the centrally provided strand or strands are themselves sheathed strands according to the invention, an even better probability is provided for protecting at least one strand within the surrounding strands. Also, improved mechanical and corrosion protection can be provided even when the centrally provided aluminium conductors are without any sheath and provided with a conductive sheath not being of the quality needed to provide improved mechanical and corrosion protection. This could reduce conductor manufacturing costs even further. It may be an advantage to provide the surrounding individually sheathed strands not entirely contacting each other at their sides thereof, i.e. not provided as a covering layer in order to enhance the contact surface area for improving the grounding capability. It may on the other hand be an advantage to provide them entirely surrounding the central object to provide better humidity entry and mechanical damage protection of the internal and/or central object or objects. Further, the cross-sectional shape of the plurality of individually sheathed strands may be any suitable shape, such as circular, oval, triangular, square, flat, in two or more layers, where centrally is then to be taken to mean being provided between at least two of said surrounding individually sheathed strands.

Advantageously, in an embodiment of said grounding conductor said plurality of aluminium strands are provided in at least one strand layer around said at least one object. This provides a very low risk that all strands are damaged in a short length and that the grounding can disappear due to corrosion damages. This is particularly advantageous when the grounding conductor is dug into very corrosive environments, as the surrounding protective strand layers are able to provide a protection over time of the internal or centrally provided objects which can at least equal and even surpass the lifetime expectancy of copper grounding devices and other less protective sheath provided aluminium strands.

In an embodiment of said grounding conductor it is further provided with a surrounding jacket. This is practical both for keeping the one or more sheathed strands together in a bundle, and for providing additional surface for improving the grounding capability. In an embodiment of said grounding conductor said jacket is of an electrically conductive material, such as the same electrically conductive polymer material or a metal. The metal could be copper or aluminium. In at least some instances, providing a thicker jacket of the same electrically conductive material can in fact reduce the corrosion protective effect even when the individual sheath is damaged or provided with holes, however, such jacket may be provided in order to increase the mechanically protective effect instead. It is also possible to use a two-layer construction, where the inner polymer material is focused on reducing the transition resistance due to contact to the aluminium oxide and the outer polymer material is focused on mechanical protection.

In an embodiment of said grounding conductor said jacket is provided entirely or partly covering said grounding conductor, such as a helically wound non-woven tape, and/or one or more an axially wound tapes, and/or a stitched thread, and/or a wire or net mesh, and/or interwoven in between said individually sheathed aluminium strands. Thus, the individually sheathed strands can be loosely or tightly held together in a bundle. This upholds the effect of the larger sheath surface area being exposed to the ground surrounding it for an improved grounding and corrosion protection effect.

The carbon black additive advantageously are of physical sizes around 5-100 nanometers. Generally, the smaller the particle size, the lower the resistivity of the composites. The filler amount can, depending on polymer matrix used, lie in the order of at 1-5 wt %, or 30 wt % carbon black, or larger than 50 wt % carbon black.

In an embodiment of the grounding conductor said sheath is provided with at least one test hole having a longitudinally extending size, and the grounding conductor having a total length, where said total length is at least 5 times longer than the sum of the longitudinally extending size of the at least one hole, such as at least 10 times longer, such as at least 20 times longer, such as at least 50 times longer, such as at least 100 times longer. It has by the invention been realized, that by providing a longer length of grounding conductor according to the invention the grounding capabilities of the total grounding conductor is increased, which generally lowers even more any corrosive deterioration effects felt after any hole damages has occurred as regards to the galvanic corrosion experienced.

The present invention further contemplates in one embodiment to provide an electrical power system comprising at least one power cable and/or power structure, which is grounded through a grounding conductor as described in any one of the embodiments mentioned above, which grounding conductor is buried in the ground and in grounding contact with said ground along substantially the length thereof, such as along the entire length thereof. The electrical power system can comprise an aerial or ground-laid power cable, a power structure, such as a transformer, a pole and/or a building, or the like in an electrical power system.

In an embodiment of said electrical power system the grounding conductor at least along one length of said cable or structure is provided alongside, such as in contact with, an outer surface of said cable or structure, or is provided substantially radially out from it, optionally a plurality of said individually sheathed aluminium strands surrounding, such as completely surrounding, and in contact with an outer surface of said cable or structure. Preferably, a plurality of said individually sheathed aluminium strands are surrounding, such as completely surrounding, and are in contact with an outer surface of said cable or structure. A ground laid cable is thereby earthed by said grounding conductor.

In an embodiment of said electrical power system the grounding conductor is provided at least along one length of said cable or structure within said cable or structure.

In an embodiment of said electrical power system it comprises a power cable being provided as an aerial cable, and said grounding conductor is provided in the ground and along at least a part of said power cable, preferably along the entire aerial cable.

The term "strand" includes herein both
- a single longitudinally extending object, which is relatively long and thin, i.e. the diameter thereof is more than 10 times, such as 100 times smaller than the length of said strand, and
- a collection of wound, spun or twisted thinner filaments or wires, the diameter of each being more than 3 times, such as 5 times, such as 10 times, such as 50 times, such as 100 times thinner than the strand itself.

The term "aluminium" includes herein both near pure aluminium and aluminium alloys, e.g. such alloys and aluminium as defined by the American Aluminium Society or ASTM International.

The term "an electrically conductive polymer material" is a polymer material exhibiting a volume resistivity $\rho$ in the order of 1 $\Omega\cdot$cm to 1000 $\Omega\cdot$cm, i.e. the term also includes a volume resistivity generally associated with electrically semi-conducting polymer material according to older definitions, and this is a polymer matrix comprising conductive particulates, such as carbon black, furnace black, acetylene black, graphite, in the form of e.g. flakes, fibres, spheres, granules, etc. When carbon black is added into a polymer matrix to a certain level, the carbon black aggregates form a continuous path and the polymer become a conductive polymer composite. The polymer matrix can optionally contain conventional additives, such as antioxidants, non-conductive fillers, flame-retardants, and others known to the skilled person.

Electrical volume resistivity $\rho$ is defined as the ratio of the electric field in a material to the density of the current it creates $\rho=E/J$, where $\rho$ is the resistivity of the conductor material (measured in ohm·meters, $\Omega\cdot$m), E is the magnitude of the electric field (in volts per meter, V/m), J is the magnitude of the current density (in amperes per square meter, A/m$^2$).

The term "hole" means herein a hole made in the sheath comprising a recess in the sheath going all the way down to the surface of the aluminium strand, which the sheath protects, and said recess laying bare a hole surface area of said aluminium strand surface, where said hole surface area may have any suitable shape, such as elliptical, triangular, rectangular, as well as a shape going entirely radially around the periphery of the sheath.

All features of the inventions including ranges and preferred ranges can be combined in various ways within the scope of the invention, unless there are specific reasons not to combine such features.

FIGURES

The invention will be explained in further details with reference to the schematic drawing in which:

FIGS. 5A, 5B-8A, 8B show grounding conductors according to four different embodiments of the invention, in perspective side view and in cross section view, respectively;

DETAILED DESCRIPTION

The drawings simply intend to illustrate the principles of the invention, and details which do not relate to the invention as such, are not shown. In the figures the same reference numbers are used for the same parts.

Figure 1:
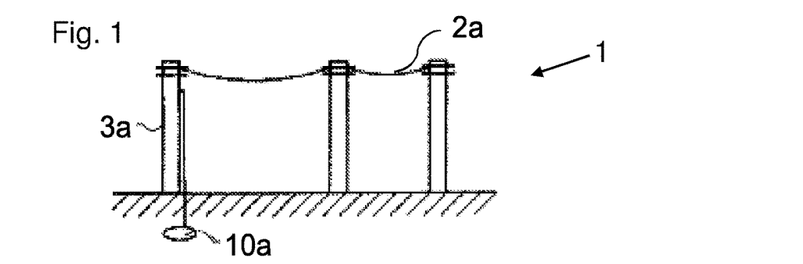
FIG. 1 shows a side view of a possible general application of a grounding conductor or grounding device in the form of a mesh for an aerial power cable in an electrical power system.
Figure 2:
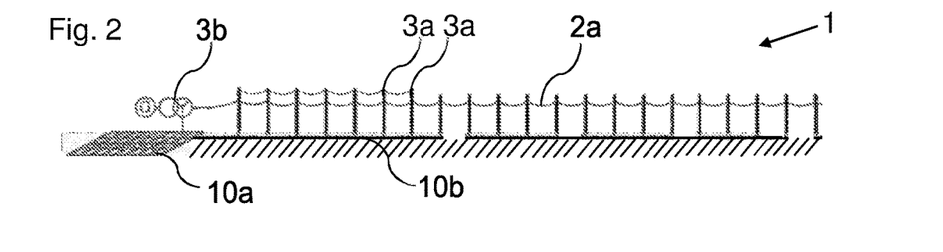
FIG. 2 shows a side view of a possible general application of a grounding conductor or a grounding device in the form of a ground-laid line running along and electrically connected to a longitudinally far extending aerial power cable in an electrical power system.
Figure 3:
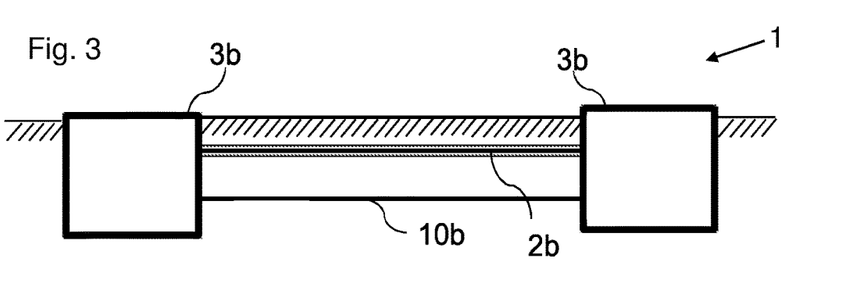
FIG. 3 shows a side view of a possible general application of a grounding conductor or grounding device in the form of a line provided alongside a ground-laid power cable between two power structures, such as two transformer stations, in an electrical power system.

FIG. 1 shows a side view of a possible general application of a grounding conductor or grounding device in the form of a mesh 10a for an aerial power cable 2a in an electrical power system 1. FIG. 2 shows a side view of a possible general application of a grounding conductor or a grounding device in the form of a ground-laid line 10b running along and electrically connected to a longitudinally far extending aerial power cable 2a in an electrical power system 1. FIG. 3 shows a side view of a possible general application of a grounding conductor or grounding device in the form of a ground-laid 10b line provided alongside a ground-laid power cable 2b between two power structures, such as two transformer stations 3b, in an electrical power system 1.

In the following reference will be made to FIGS. 1-3. A Grounding conductor 10a, 10b is intended for air and/or ground laid power line distribution network applications, where the grounding conductor 10a, 10b according to embodiments in particular is adapted to be laid underground or in water. The grounding conductor 10a, 10b is either a) see FIGS. 1 and 2 provided in connection with or at a distance to an AC or DC power cable 2a, 2b such as an AC single or three phased power cable, or power structure, such as a pole 3a, a transformer station 3b, or a building, which power cable 2a, 2b or structure 3a, 3b is provided above ground, or b) see FIG. 3 provided in direct contact with or alongside said power cable 2b in the ground. The purpose of the grounding conductor 10a, 10b is to form a ground or earth potential to the power cable 2a, 2b or structure 3a, 3b.

Some grounding conductors 10b are provided following, along, or being integrated with ground laid power cables 2b, see FIG. 3. In some cases at least part of said grounding conductor 10a, 10b is provided following, along, or integrated with aerial power cables 3a, see FIGS. 1 and 2. The grounding conductor 10a may be applied in the ground near individual poles 3a, as shown in FIG. 1, on site providing system ground, under transformers 3b, or close by buildings, e.g. by providing a mesh 10a, or can be applied following the power cable 2 and laid underground as a ground conductor 10b, see FIG. 2. The grounding conductor 10a, 10b may be utilized comprising any suitable diameter as to form straight or twisted wires, strands, rods, or pipes. In FIGS. 1-3, the earth symbol is provided simply to indicate that an earth potential is reached for the grounding conductor 10a, 10b in question and does not indent to show the position or the efficiency of the grounding conductor 10a, 10b in question.

Figure 4:
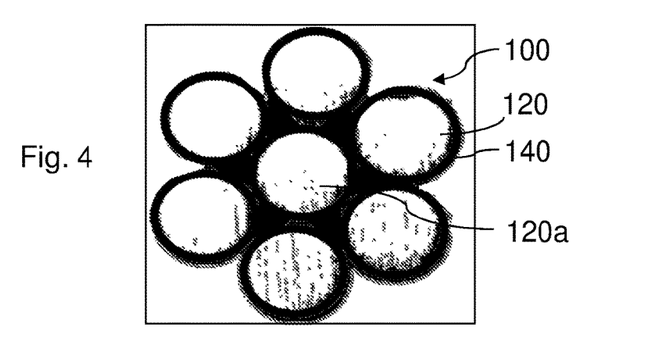
FIG. 4 shows a photo of a sectional cut of a grounding conductor in an embodiment of the invention.

The grounding conductors 10a, 10b discussed in connection with FIGS. 1-3 comprise in accordance with the present invention grounding conductors 100 as discussed herein and in the following, with reference to FIGS. 4-8B, 17, 20, and 21. FIG. 4 shows a photo of cross section view cut through a grounding conductor 100 according to an embodiment of the invention. The conductor 100 comprises a conductive metal part comprising seven solid aluminium strands 120 twisted together, each strand being of an approx. equal diameter dw around 2.6 mm. Each strand 120 is individually sheathed with a conductive polymer material sheath 140 of generally uniform thickness ts around 0.3-0.4 mm. The conductive polymer material is a polypropylene matrix comprising a filler of conductive particulates in the form of carbon black. By providing several individually sheathed strands the conductor surface area is increased as an increased outer surface area of the aluminium strand is in contact with the sheath inner surface area. This increases the grounding effect of the grounding conductor 100 as well as increases the corrosion protection provided by the conductor according to the invention. Further, by entirely surrounding the central inner strand 120a with six outer strands 120 the inner strand 120a is much better protected both as regards mechanical and corrosion protection; even if one or all of the outer strands 120 and/or their sheaths 140 are damaged, the inner strand is still protected and enables a continued operation as grounding conductor. No jacket is provided, and this increases the grounding and corrosion protection effect relative to when a jacket in e.g. the same conductive polymer material is provided around the individually sheathed strands.

FIGS. 5A, 5B-8A, 8B show grounding conductors 100 according to four different embodiments of the invention, in perspective side view and in cross section view, respectively.

Figures 5A, 5B:
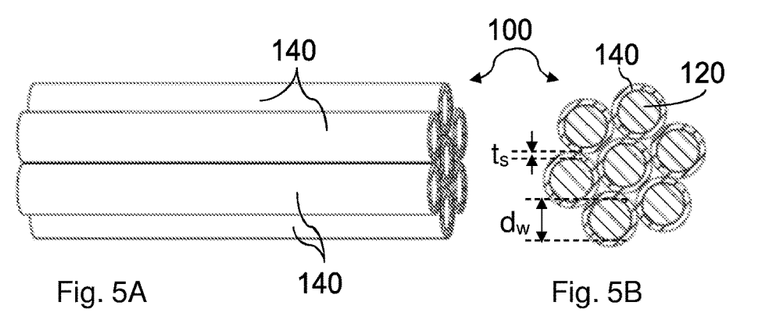

FIGS. 5A and 5B show a grounding conductor 100 comprising seven aluminium strands 120 of equal diameter $d_W$ around 3 mm: A central strand surrounded by six outer strands, each strand being coated or provided with a sheath of conductive polymer material of a thickness $t_S$ of around 0.3 mm. The strands are provided lengthwise along each other. Alternatively, they can be provided twisted or wound around each other lengthwise. The sheathed strands can be provided loosely along each other as shown, can be adhered together by e.g. heat-treating the polymer sheaths or by gluing, or can be kept together by a wire or paper jacket (not shown).

Figure 6A:
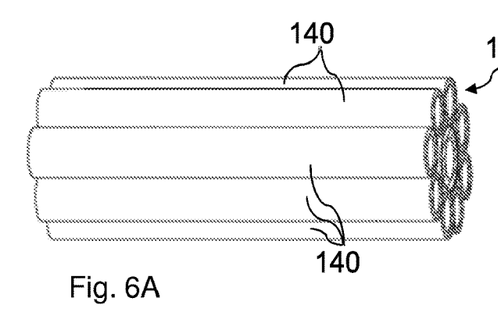
Figure 6B:
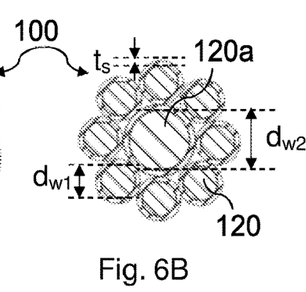

FIGS. 6A and 6B show a grounding conductor 100 comprising nine aluminium strands 120, eight being of equal cross sectional diameter $d_{W1}$ around 3 mm surrounding a central strand 120a of a larger cross sectional diameter $d_{W2}$ around 5 mm. Each strand 120, 120a is coated with a sheath 140 of conductive polymer material of a thickness $t_S$ of around 0.3 mm. The sheathed strands 120 are provided lengthwise along each other. By providing this setup e.g. as compared to the embodiment shown in FIGS. 5A and 5B, the external surface area of the conductor 100 is increased, which improves the grounding effect of the conductor, as well as provides a better corrosion protection. Further, by increasing the number of surrounding strands 120 in the conductor, the risk of all the strands being damaged during laying or use, is reduced. Further, by providing such one surrounding layer or more layers of sheathed strands 120 around at least one central sheathed strand 120a, the central strand 120a or strands is/are better protected by these at least one layers of surrounding strands 120, which reduces the risk of damaging at least the central strand 120a or strands, and increases the overall grounding effect.

Figure 7A:
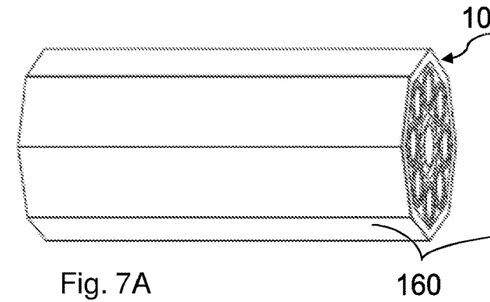
Figure 7B:
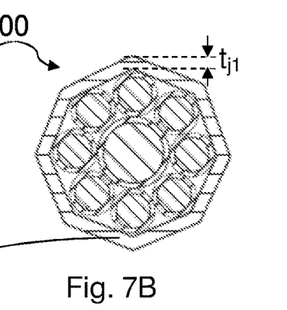

FIGS. 7A and 7B show a grounding conductor 100 with the same number, position, and cross sectional diameter of individually sheathed aluminium strands 120 as shown in FIGS. 6A and 6B, further being surrounded by a jacket 160 having a uniform thickness tj1 of around 1 mm, e.g. provided by extrusion. Due to the provision of the eight surrounding sheathed strands 120, and a malleable jacket material, such as a polymer, such as a conductive polymer, the outer and inner surface of the jacket adapts its shape to form a cross sectional octagon. Note that the exposed jacket surface area size of the grounding conductor shown in FIGS. 7A and 7B is in fact less than the exposed sheathed surface area size of the grounding conductor shown in FIGS. 5A and 5B, and 6A and 6B, respectively, and therefore these latter conductors may be advantageous as regards to more effective grounding effect as well as better corrosion protection, while the former conductor may advantageously provide better mechanically protection than the latter conductors.

Figure 8A:
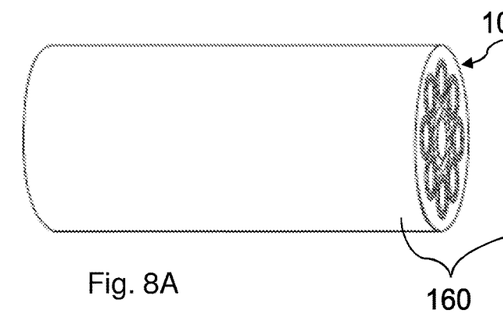
Figure 8B:
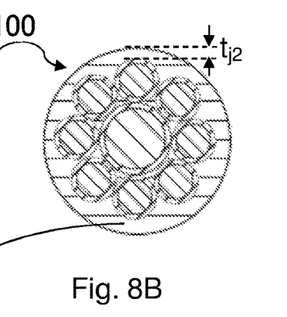

FIGS. 8A and 8B show a grounding conductor 100 with the same number, position, and cross sectional diameter of individually sheathed aluminium strands as shown in FIGS. 6A and 6B, further being surrounded by a jacket 160 having a non-uniform thickness tj2 of around 1 mm at its thinnest and around 2.2 mm at its thickest part, e.g. provided by melt extrusion or by a downstream heating step. Due to the provision of the heat meltable processing of the jacket material, such as a polymer, such as a conductive polymer, the cross sectional shape of the grounding conductor with jacket 160 is substantially round, and the polymer jacket material has entered over the outer surfaces of the sheathed eight surrounding sheathed strands, and optionally (not shown) in between the strands, to thus provide a better contact between the inner surface of the jacket 160 and the outside of the sheaths 140 thus jacketed. To further improve this jacket-sheath contact along the extension of the conductor, a further process step of compressing the jacket 160 during or after the extrusion may be applied.

Preferably, the external sheath surface or the external jacket surface of the grounding conductor 100 has a low friction coefficient enabling an easy laying in the ground.

Two different conductive polymer material identification test procedures were identified during Inventors performance of a number of extensive test series of corrosion susceptibility of different conductive polymer sheath materials. The two test procedures, individually or together, was identified to establish criteria whether such a material is able to perform satisfactory both by protecting the aluminium strand and thus the grounding conductor from corrosion as well by providing it with not only a sufficient but also a superior grounding capability.

Starting out with performing corrosion tests according to the IEC standard 60229, Inventor developed the two tests to determine the conditions under which an aluminium strand sheathed with such material could be identified as providing such well performing material.

Figure 9:
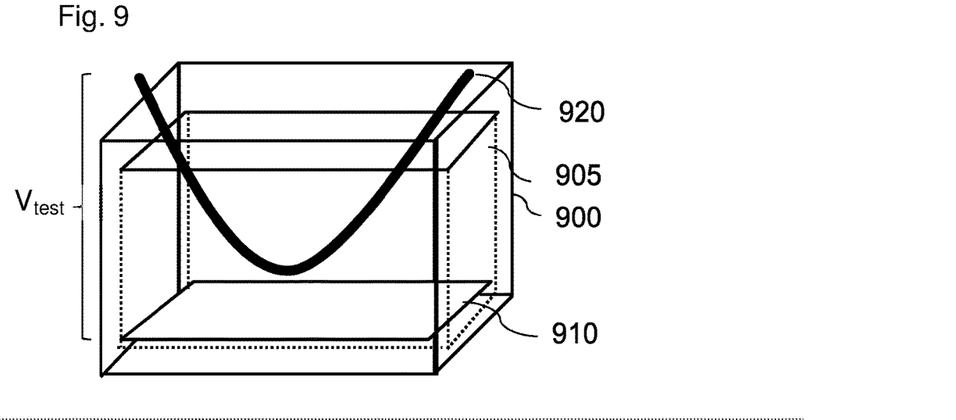
FIG. 9 shows a very schematic view of a test procedure setup for a grounding conductor according to the invention of said first and second test procedure.

Setup for and results from grounding conductors subjected to first and second test procedures according to the invention FIG. 9 shows a schematic perspective drawing illustrating a setup for testing a grounding conductor to verify whether the grounding conductor is according to the present invention, showing a polyethylene container 900 comprising a volume of about 1 l liquid 905 consisting of a 1 vol % sodium sulphate solution, i.e. an aqueous electrolytic solution and at ambient temperatures. A length ls here 200 mm of a conductor under test 920 is submerged, being bent to be accommodated inside the container 900 and provided at its deepest point at a depth of around 0.5 meter. Further, inside the liquid volume 905 is provided a copper plate electrode 910 near the bottom of the container and at a, constant between samples, minimum distance of 20-25 cm to the conductor under test 920. Other electrode metal materials, such as aluminium, as well as electrode sizes and shapes, such as a foil, can be contemplated by the skilled person, as well as container material, shape and size, as well as other positioning's of the conductor, electrode and liquid level over conductor relative to each other. It may be advantageous to adapt these sizes to the current values being used, as well as the physical size of the conductor under test.

During the two tests a test current is applied running between said conductor under test 920 and the electrode 910 such that a potential can be measured over said conductor under test 920 and said electrode 910.

In the test measurements performed herein discussed below, all conductors being tested were submerged entirely along the length, one by one, and all comprising a single aluminium strand having a strand diameter dw of 3.06 mm, and when sheathed, was provided with a substantially uniform thickness of the conductive polymer sheath of around 0.3 mm. For this size of container preferably strand widths or conductor widths of between 5 mm and 30 mm, such as 20 mm-25 mm can be tested.

First Procedure Tests and Results

The conductors under test 920 were the following test samples for the first series of measurements according to the first procedure:
  a grounding conductor according to the invention, denoted Sample 1,
  a grounding conductor not according to the invention, denoted Sample 2, comprising a sheath of a polymer base from polyethylene by the trade name DHDA 7708-BK supplied from the company DOW.

First, Sample 1 was inserted into the sulphate solution of the above setup, and a first set test current of 1 mA was applied from one end of Sample 1 and to the electrode 910, such that a negative test potential was applied to said aluminium strand relative to said electrode, and the potential difference, named the sheathed-strand potential difference between the electrode and the Sample 1 was noted. A second set test current of 3 mA was applied, and so on along suitable intervals, such that a test current within a first test current range was provided there between, resulting here in measuring over a series of current and potential measurements being logged over said first current range from 1 mA to 10 mA.

Thereafter, Sample 2 was inserted into the same sulphate solution of the above setup, and the electrical potential difference was measured from one end of Sample 2 and to the electrode 910, measuring a test series with the same intervals over the same first current range from 1 mA to 10 mA.

Thirdly after testing the above conductors, the sheath material from Sample 1 was removed and a bare aluminium strand was provided, denoted "Bare strand". Bare strand was inserted into the same sulphate solution of the above setup, and the electrical potential was measured from one end of the Bare strand and to the electrode 910, measuring over the same first current range from 1 mA to 10 mA.

Figure 10:
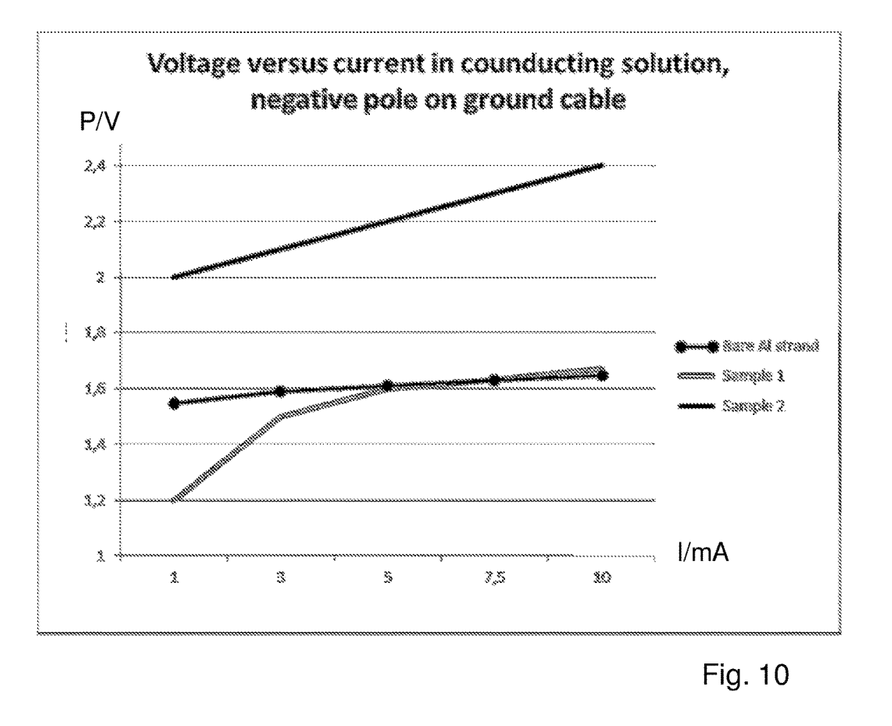
FIG. 10 shows a diagram depicting one illustrative result of a grounding conductor first test procedure according to the first embodiment (Sample 1 and bare Al strand), as well as for comparison the result of a grounding conductor not according to the invention (Sample 2)
Figure 11:
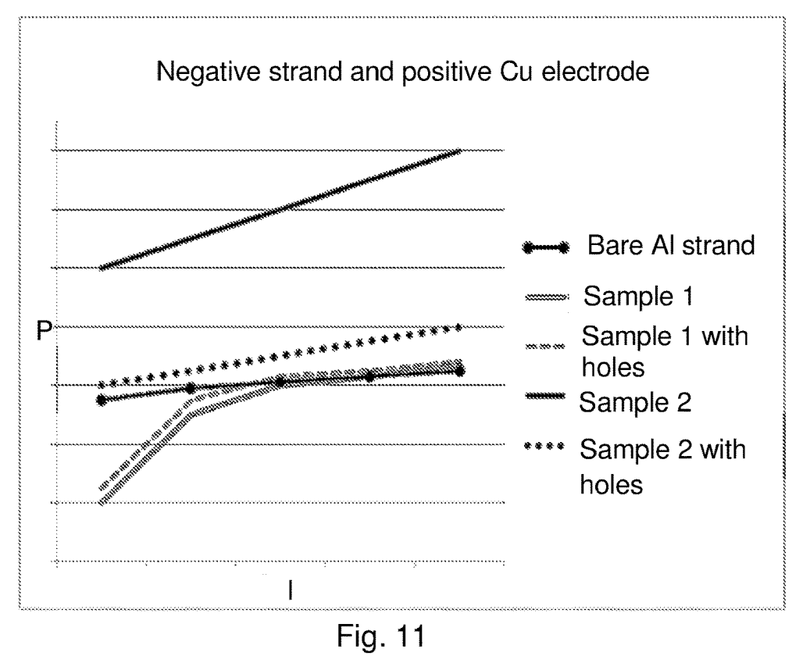
FIG. 11 shows a diagram depicting one illustrative relative result of a grounding conductor first test procedure according to the first embodiment (Sample 1 and bare Al strand), as well as a result of a grounding conductor second test procedure according to the second embodiment (Sample 1 and Sample 1 with holes), as well as for comparison the result of a grounding conductor not according to the invention having a complete sheath (Sample 2) and of a grounding conductor not according to the invention provided with holes (Sample 2 with holes), and where the polarity of the test potential between strand and electrode is a negative strand relative to the electrode.
Figure 12:
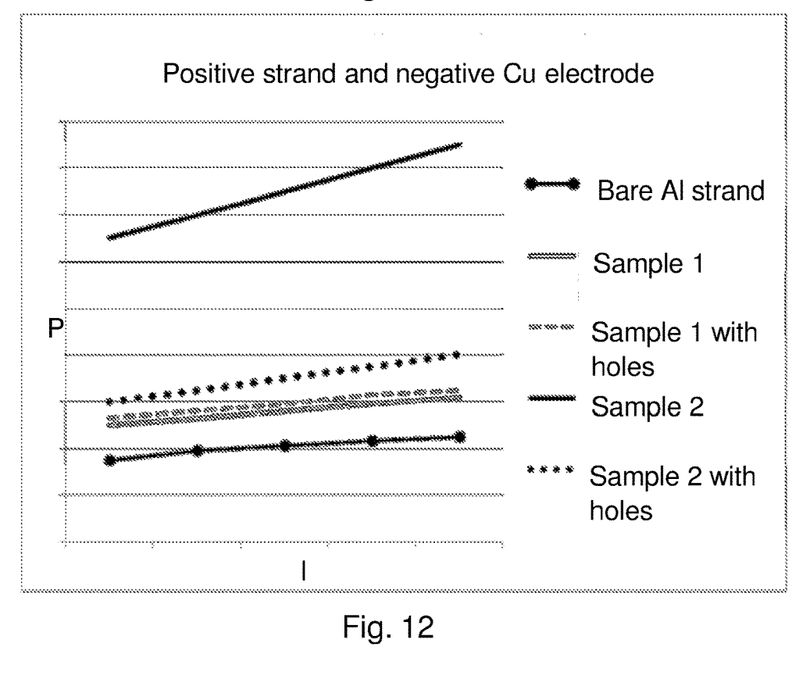
FIG. 12 shows a diagram depicting one illustrative relative result of a grounding conductor second test procedure (Sample 1 and Sample 1 with holes), as well as for comparison the result of a grounding conductor not according to the invention having a complete covering (Sample 2) and of a grounding conductor not according to the invention provided with holes (Sample 2 with holes), where the result from a bare aluminium strand is also shown for reference, and where the test polarity is reversed, strand and electrode being positive and negative, respectively.

Table 1 and 2 comprises the test results for test procedure one and two, respectively, and in FIGS. 10, 11 and 12 are shown diagram of the result achieved.

TABLE 1

|  | I/mA | | | | |
| --- | --- | --- | --- | --- | --- |
|  | 1 | 3 | 5 | 7.5 | 10 |
| Potential difference | V | V | V | V | V |
| Sample 1 | 1.20 | 1.50 | 1.60 | 1.63 | 1.67 |
| Sample 2 | 2.00 | 2.10 | 2.20 | 2.30 | 2.40 |
| Bare strand | 1.55 | 1.59 | 1.61 | 1.63 | 1.65 |

From the result in FIG. 10 it can be seen that the potential difference measured for Sample 1 after one point in the first current range, namely around 7.5 mA. Note: The diagrams have non-linear x-coordinates) and below acquires the same or a lower potential difference than does the Bare strand. Further, it can be seen Sample 2 does not at any point go below the potential difference for the Bare strand over the first current test range.

TABLE 2

|  | I/mA | | | | |
| --- | --- | --- | --- | --- | --- |
|  | 1 | 3 | 5 | 7.5 | 10 |
| Potential difference | V | V | V | V | V |
| Sample 1 w holes | 1.25 | 1.55 | 1.63 | 1.65 | 1.68 |
| Sample 2 w holes | 1.60 | 1.65 | 1.70 | 1.75 | 1.80 |
| Bare strand | 1.55 | 1.59 | 1.61 | 1.63 | 1.65 |

Due to the fact that many polymer manufacturers tend to not disclose their polymer makeup and the fact that Inventor manufactures cables from such non-disclosed polymer compounds, it was a rather laborious job to identify and verify what makes and when a conductive polymer material is suitable as a corrosion protection sheath for an aluminium grounding conductor. During these initial tests many setups and conductive polymer materials among others were tried out to provide an overview over the one or more parameters needed to be fulfilled by the grounding conductor for providing an effective corrosion protection under different soil and environment conditions.

The setup as shown in FIG. 9 illustrates one way how to provide for the first and second test procedures, however other setups can be contemplated by the skilled person, such as measuring according to the IEC standard 60229 corrosion test. E.g. in another such suitable setup, the container was a copper tank comprising 100 l of the test solution in question, and the strand was 1.2 m long lw and having 1 m thereof submerged into the solution at a depth of around 0.5 m, and provided substantially not bent therein.

The tests according to the invention but of different setups provide the same indicator or criteria for determining the provision of a low potential difference during test for deciding which conductor is according to the invention.

Other conductors tested comprised a sheath of a polyethylene base bearing the trade name of LE 0563 supplied from the company Borealis and providing a semi-conductive polymer material and comprising carbon black, but exhibited less effective corrosion inhibition, and thus were not a grounding conductor according to the invention.

Test performed with DC potential V test in the order of 0.1 to 30 V depending on test conditions. When testing certain conventional or less suitable conducting polymer materials even higher potentials were measured, such as around 100-400 V.

Advantageously, the provided grounding conductor according to the invention further lives up to the requirements of 1) withstanding a maximum of 50 V potential difference towards ground in extreme operation conditions 2) a max current of 50 ampere AC into the conductor at all times ~ between stations, line faults around 100-1000 ampere or more. It was dimensioned here to withstand 65 A/mm2 over 1 second for all grounding conductors.

These parameter influences on test voltage/test current range being utilized: Length of strand in conducting liquid, sheath surface area contacting liquid, distance from strand surface to electrode (seem to influence the most), liquid volume, and the same depth being kept.

For the ensuing tests of lightning endurance, abrasion resistance, and corrosion resistance, a selection of similar lengths of the same grounding conductor according to the invention was provided having a physical section as shown in FIG. 4 comprising seven equal diameter dw of around 3.06 mm aluminium strands, each individually sheathed by an as above identified conductive polymer material having a uniform thickness ts around 0.3 mm, and each provided not adhering to mutually and twisted around each other at a twist length of around 14 cm.

Performance tests of grounding conductor according to invention.

The lightning tests were carried out to test the performance of a grounding conductor sample according to the present invention as regards to satisfactory performance during lightning or fault currents in the surrounding ground soil. The sample was a grounding conductor from one strand wound by seven aluminium filaments, comprising a surrounding sheath.

Figure 13:
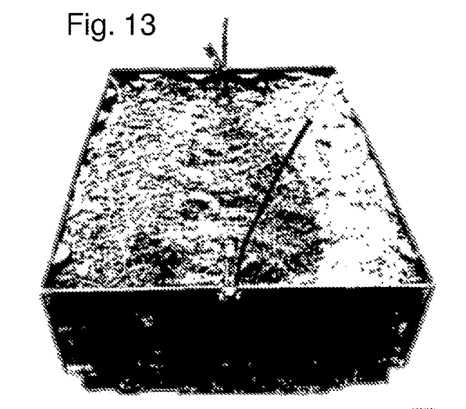
FIG. 13 shows a short-duration high voltage electromagnetic discharge (lightning) test setup comprising a container with humus soil and a length of the grounding conductor inserted with its ends extending therefrom.

A lightning test setup was provided as seen in FIG. 13: A container around 1.5 m wide×1 m long×1 m high was provided enclosing a copper plate for providing electrical earth potential to water saturated humus soil filled into the container on top of the copper plate for providing resistance and a current path there through. The sample length was such that one meter thereof was buried within the soil along and at around 20 cm from the copper plate, and having each sample end extending from the soil. The sample ends were attached to a Marx voltage generator for providing a steadily increased voltage up to 40 kV. A lightning current or electromagnetic impulse happened around 30 kV resulting in an current surge reaching around 800 A in an arc generated between one or more positions on the sample and the copper plate, which was provided in series with a current shunt for measuring this lightning current. Then the sample was removed from the soil and inspected.

The result was that the sample was able to withstand the current impulse such that the aluminium conductor could survive the up to 800 A electromagnetic impulse there through. At four arc influenced positions on the sheath material part of it was entirely removed forming individual holes of around 0.8-2 mm with noticeable melting around the hole area, as well as blackened sheath parts surrounding the hole. In other places, as seen in FIGS. 14A and 14B at the arc positions only a few charred and blackened abrasions of around 0.01-0.1 mm were seen on the top surface of the sheath of an area comparable to the hole area in the sample.

Thus, the test showed that a grounding cable according to the invention during use in the ground is submitted to lightning, it has a reasonable chance of still functioning appropriately and providing mechanical and moisture protection.

Figure 14A:
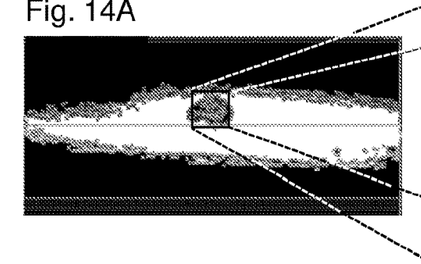
FIG. 14A shows a photo of the lightning tested grounding conductor of FIG. 13 at one location after the lightning test.
Figure 14B:
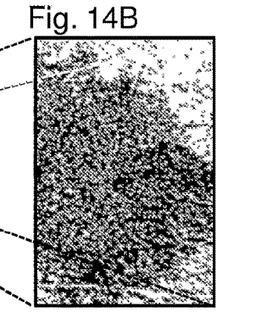
FIG. 14B shows a 50× magnification of the location on said lightning tested grounding conductor of the cutout as shown in FIG. 14A.

FIGS. 14A-14B illustrates another important advantage of the grounding conductor according to the invention. Inventor noted during the lightning tests that due to this fact and a good contact provided between the aluminium strand and sheath when lightning pulses or faults occur in the electrical system to be serviced by the grounding conductor it can better conduct currents up to about 1000 Nm into a good conducting soil before the conducting polymer sheath exhibit damages, see the relatively small holes formed in the sheath material in FIGS. 14A, 14B, in the order of 0.01 mm-0.1 mm. Thus, as a side-effect, an improved grounding capability entails better resistance against lightning. The resistance over the sheath of the sample is advantageously low with resistances of below 100 Ω·cm, preferably below 50 Ω·cm, more preferred below 30 Ω·cm.

Different abrasion tests, e.g. such as set out in IEC standard 60229, were also carried out. The purpose was to demonstrate that the extruded sheath of the present invention could withstand abrasion during the laying operation since the sheath thickness of the grounding conductor in some cases does not comply with IEC cable standards. The tests showed that indeed conductors according to the invention were able to withstand these tests, when relative to the IEC standard test approximately half the force was used in the test setup for a grounding conductor test sample having a diameter of around 3.06 mm and a sheath thickness of around 0.3-0.4 mm.

Corrosion tests, such as set out in IEC standard 60229, were also carried out. The purpose was to demonstrate that, in the event of local damage to a sheath, any consequential corrosion of the outer surface of the aluminium strand would remain virtually confined to the damaged area of covering, preferably reduced corrosion would be observed relative to a bare grounding conductor.

In the following and in connection to FIGS. 15-21 is described what Inventor presume to be some of the possible causes for the more effective anti-corrosion layer provided by the present invention in relation to the above mentioned tests.

Figure 15:
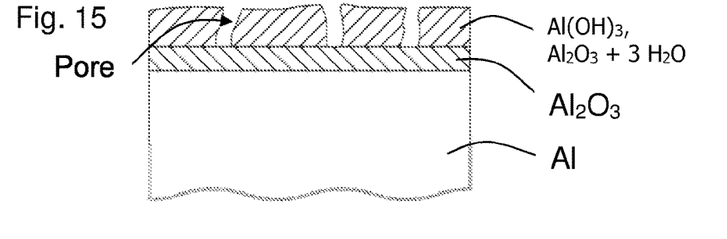
FIG. 15 shows a side view of a close-up longitudinal cut of a top part of an aluminium strand laid bare.

In FIG. 15 is shown a cut-out of an aluminium surface with no sheath, i.e. bare, such as one side surface of an aluminium strand along the length thereof. Aluminium surfaces will generally formulate a white, protective layer of oxygen induced corrosion in the form of aluminium oxide if left unprotected from the atmosphere or water. As shown in FIG. 15 this aluminium oxide layer basically consists of amorphous $Al_2O_3$ in two partial layers on top of each other, namely

- a nearly pore free barrier layer of amorphous aluminium oxide $Al_2O_3$ up to around 0.1 micrometer thick on top of the aluminium layer Al and
- a hydrated cover layer with low crystalline contents and comprising Al-hydroxides $Al(OH)_3$ and Bayerite $Al_2O_3 + 3\, H_2O$ up to about 0.3 micrometer thick on top of the aluminium oxide layer, where the hydrated cover layer further is provided with micropores in the form of pits or holes around 1 micrometer in diameter and up to 0.3 micrometer deep, extending all the way up from the $Al_2O_3$ surface. Further, other aluminium oxides may be present as a mix with the porous layer.

The thickness of the $Al_2O_3$ layer increases with time, temperature, whether anodization was used, and the availability of oxygen. Even though the oxide layer is very tight, durable, has a melting temperature of 2.300° Celsius, and protects the aluminium surface from further corrosion, it can over time also become porous and pick up humidity, which then increases its corrosion susceptibility. Further, the density of $Al_2O_3$ is higher in comparison to the aluminium metal itself, and the electrical resistivity of $Al_2O_3$ is very high, $1 \times 10^{14}$ Ω·cm.

Figure 16:
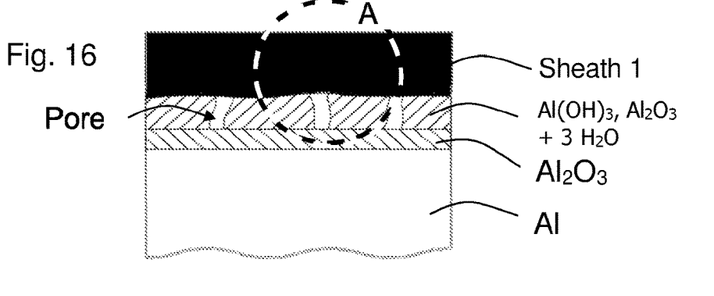
FIG. 16 shows a side view of a longitudinal cut of a top part of an aluminium strand provided with sheath of a conventional conductive polymer material.

In FIG. 16, in a conductor not according to the invention, Sheath 1 is made from the conductive polymer material based on Low Density Polyethylene (LDPE) from Borealis by the trade name LE0563 added a conductive filler of carbon black. The Sheath 1 is applied by extrusion and by the combination of added carbon black, extrusion and polyethylene, the viscosity of the mix may increase, because when adding a higher content of low size conductive particles, then the viscosity of the mix tends to increase. As a result the polymer compound may not enter deep enough, inside the pores, and into contact with the aluminium oxide layer. Therefore, the "islands" of hydrated aluminium in contact with the polymer will, at the current densities and potentials experienced when providing ground for power cables, simply form too high potential walls for the very low current to flow during normal operation of the electrical power system. Further, any humidity and leaks from any damages of the polymer tend to gather in the pores and inside the hydrated aluminium, which increases corrosion there.

Figure 17:
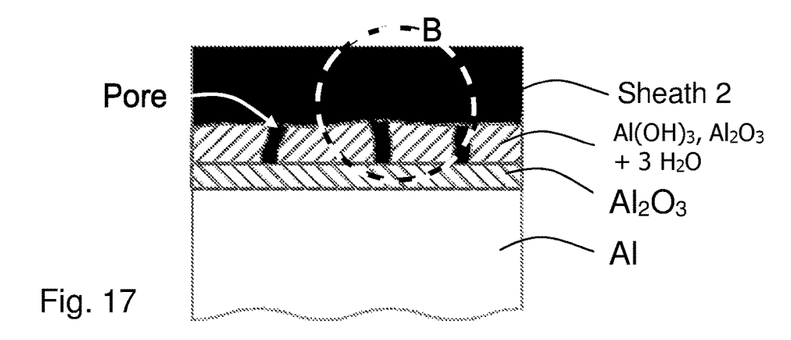
FIG. 17 shows a side view of a longitudinal cut of a top part of an aluminium strand provided with sheath of a conductive polymer material in a grounding conductor according to the invention.
Figure 18:
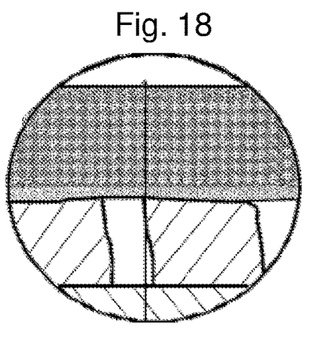
FIGS. 18-19 show illustrative close-ups of side views in the cut-out named A in FIG. 16.
Figure 19:
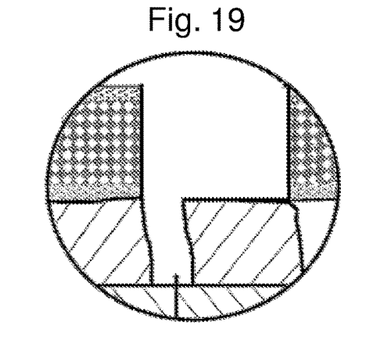
Figure 20:
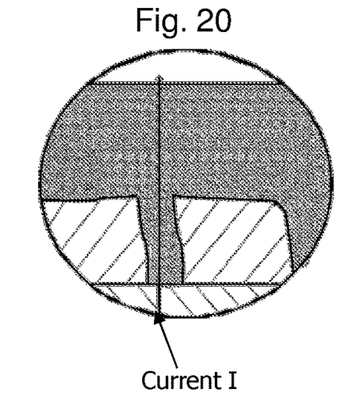
FIGS. 20-21 show illustrative close-ups of side views in the cut-out named B in FIG. 17.
Figure 21:
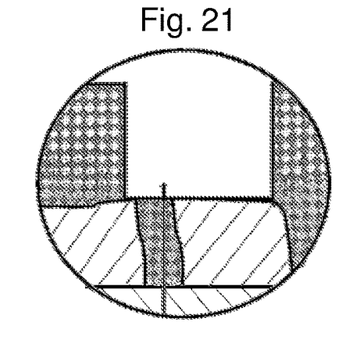

In FIG. 17, Sheath 2 is made from a conductive polymer and the grounding conductor according to the invention is provided. Advantageously, the aluminium oxide and sheath are in good surface contact with each other, also in the bottom of the pores, and this good surface contact may provide a preferred "road" for the electrical current to go along, when needed.

This may be provided in each conductive polymer according to the various embodiments discussed herein, which embodiments are:

- a conductive polymer material comprising a polyolefin mixed with an elastomer, 10-40% high purity carbonaceous material, and an antioxidant,
- conductive polymer material comprising a polypropylene mixed with an ethylene/propylene elastomer, 23-30% carbon black, and a phenolic antioxidant,
- a conductive polymer material comprising 62-68% polypropylene mixed with an ethylene/propylene elastomer, 23-30% carbon black, and 2-4% phenolic antioxidant, and
- a conductive polymer material comprising 25-70% polypropylene, 15-55% ethylene/propylene elastomer, 23-30% carbon black, and 2-4% phenolic antioxidant.

Inventor has, by performing the above tests and others, noticed the following measures as being beneficial for an increased corrosion protection as well as for an improved grounding conductor effect in the discussed conductive polymer materials, while also providing a mechanically sufficiently protected conductor:

- A low viscosity polymer compound which can more easily enter into the pores, see FIG. 16 relative to FIG. 17;
- A high electrical conductivity, vis-à-vis low resistivity of the sheath. This can be provided by increased filler content in the conductive polymer, though controlled as not to increase viscosity too much, as well as selecting a reduced particulate size of the filler. Filler content and low viscosity is preferably adjusted in order to provide a high conductivity; a high-grade carbon black quality is preferably used having a high purity and small size for ease of entering into the pores. Also an increased conductivity also depends on which polymer matrix is chosen, e.g. whether a good combination compound is used, preferably a conductive polymer material with low volume resistivity, such as lower than 100 Ω·cm is selected, leading to the polymer compound's conductivity being high. Further, when the resistivity is low the sheath's polarity is balanced thereto; this can be achieved by selecting a suitably high conducting/low resistive polymer matrix and/or adding further fillers, known in itself by the skilled person;

the polarity of the sheath is controlled, advantageously in one embodiment a certain amount of non-polar and/or non-insulative materials e.g. non-polar rubber is added such as an ethylene-propylene (EP) rubber EPR, such as EPDM (aka EPT: ethylene propylene terpolymer), EPR (aka EPM: ethylene propylene copolymer), nitrile butadiene NB, natural rubber NR, butadiene rubber BR, styrene butadiene rubber SBR. Alternatively or additionally, a non-polar or non-polar making additive is added;

increasing the surface adherence of the sheath is advantageous, i.e. an increased stickiness of the conductive polymer compound to the aluminium surface, in particular to the aluminium oxide surface inside the pores. The adherence may be further improved when manufacturing the sheath onto the aluminium strand it is advantageously to press it, e.g. using pressure extrusion, and/or pressed mechanically during laying and/or during curing onto the surface of the strand better enabling to press the polymer into the pores—this also fills up the pores with conductive material and a lower resistivity of the sheath and of the sheath/aluminium oxide contact surface is obtained;

a relatively low contact resistance between conductive polymer and aluminium surface, advantageously filling out the pores of the aluminium oxide to provide an even lower contact resistance and at the same time exhibit a low surface resistance relative to the surrounding media—then any accumulated potential difference over the aluminium/polymer contact surface, which might corrode the aluminium surface, is led out via the low resistive conductive polymer sheath instead of through the aluminium and the corrosion rate of the aluminium is slowed down significantly;

the thickness of the sheath. It is advantageously selected relative to the diameter of the strand, as well as to which application, the conductor is intended to be used in;

a corrosion reducing additive or base polymer can be added or utilized in the polymer, however the tests have shown this measure may not be necessary, it may even sometimes reduce the other here mentioned beneficial effects;

either actively reducing the amount of low molecular content in the exterior surfaces of the compound since some polymers, such as e.g. polyethylene tend to deposit these at its outer surfaces during setting and may then act electrically isolative in these parts, and/or by adding fillers, such as e.g. EVA, EBA or the like, for lowering these tendencies and keep the low-molecular content better distributed inside the polymer matrix.

All these measures seem to lead to an effect of reducing the sheath resistance and thus lowering the potential wall of the sheath and increasing the conductive property of the filler inside the matrix to such a degree that the potential wall on the parts where the hydrated aluminium "islands" between the pores is larger than the potential wall over the aluminium oxide and sheath contacting parts inside the pores, even when significantly large holes exits in the sheath surface, providing primarily an excellent corrosion protection effect.

What is claimed is:

1. A grounding conductor (100) comprising a plurality of conductive aluminium strands (120) wherein each such strand (120) is provided with at least one sheath (140) comprising an electrically conductive polymer material having a volume resistivity (ρ) below 100 Ω·cm.

2. The ground conductor according to claim 1, wherein at least some of the plurality of aluminium strands (120) are twisted around each other.

3. The grounding conductor (100) according to claim 1, wherein at least some of the plurality of conductive aluminium strands (120) entirely surrounds one centrally provided conductive aluminium strand (120a) of the plurality of conductive aluminium strands (120).

4. The grounding conductor (100) according to claim 1, wherein a total transitional resistance for one of the plurality of the conductive aluminium strands (120) provided with at least one sheath (140) to a surrounding media is lower than a transitional resistance for a bare conductive aluminium strand of the plurality of the conductive aluminium strands to the same surrounding media.

5. The grounding conductor (100) according to claim 1, wherein the conductive polymer material comprises a polyolefin mixed with an elastomer, 10-40% high purity carbonaceous material, and an antioxidant.

6. The grounding conductor (100) according to claim 1, wherein the conductive polymer material comprises polypropylene mixed with an ethylene/propylene elastomer, 23-30% carbon black, and a phenolic antioxidant.

7. The grounding conductor (100) according to claim 1, wherein the conductive polymer material comprises 62-68% polypropylene mixed with an ethylene/propylene elastomer, 23-30% carbon black, and 2-4% phenolic antioxidant.

8. The grounding conductor (100) according to claim 1, wherein the conductive polymer material comprises 25-70% polypropylene, 15-55% ethylene/propylene elastomer, 23-30% carbon black, and 2-4% phenolic antioxidant.

9. The grounding conductor (100) according to claim 1, wherein each of the plurality of conductive aluminium stands (120) provided with a sheath (140) has an aluminium strand diameter (dw) within a range of 0.2-25 mm, such as within a range of 0.5-8 mm, and a sheath thickness (ts) within a range of 0.2-0.7 mm, such as from 0.25 mm to 0.5 mm, such as from 0.35 mm to 0.45 mm.

10. An electrical power system (1) comprising a power cable (2a, 2b) or structure (3a, 3b), which is grounded through a grounding conductor (100) according to claim 1 buried in the ground and in grounding contact with the ground along the length thereof.

11. The electrical power system (1) according to claim 10, comprising a power cable (2b), wherein the grounding conductor (100) at least along one length of the power cable (2b) is provided alongside and in contact with an outer surface of the power cable (2b).

12. The electrical power system (1) according to claim 10, wherein the power cable (2a) is an aerial cable (2a), and the grounding conductor (100) is provided in the ground and along at least a part of the power cable (2a).

13. Use of a grounding conductor (100) according to claim 1 as a ground conductor (10*b*) running in parallel with a power cable (2*a*, 2*b*) between two power structures (3*a*, 3*b*) to provide a ground potential to the power cable (2*a*, 2*b*) or the power structure (3*a*, 3*b*).

14. The use of a grounding conductor (100) according to claim 13, wherein the two power structures (3*b*) are transformer stations (3*b*).

15. The use of a grounding conductor (100) according to claim 13, wherein the ground conductor (10*b*) is laid underground.

* * * * *